United States Patent
Ganmukhi et al.

(10) Patent No.: US 6,233,243 B1
(45) Date of Patent: May 15, 2001

(54) METHOD AND APPARATUS FOR PERFORMING CUT-THROUGH VIRTUAL CIRCUIT MERGING

(75) Inventors: Mahesh N. Ganmukhi, Carlisle; Prasasth R. Palnati, Waltham, both of MA (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 08/976,759

(22) Filed: Nov. 24, 1997

(51) Int. Cl.[7] ................................................. H04L 12/54
(52) U.S. Cl. ............................................ 370/412; 370/429
(58) Field of Search .................................. 370/235, 401, 370/402, 412–418, 399, 474, 389, 428, 429

(56) References Cited

U.S. PATENT DOCUMENTS

| | | | |
|---|---|---|---|
| 4,737,953 | 4/1988 | Koch et al. | 370/94 |
| 5,307,345 | * 4/1994 | Lozowick et al. | 370/428 |
| 5,379,296 | 1/1995 | Johnson et al. | 370/60 |
| 5,434,864 | 7/1995 | Perlman et al. | 370/85.13 |
| 5,440,691 | 8/1995 | Carrafiello et al. | 395/250 |
| 5,465,331 | 11/1995 | Yang et al. | 395/200.08 |
| 5,471,472 | 11/1995 | McClure et al. | 370/85.13 |
| 5,477,547 | 12/1995 | Sugiyama | 370/85.13 |
| 5,481,540 | 1/1996 | Huang | 370/85.13 |
| 5,483,640 | 1/1996 | Isfeld et al. | 395/200.03 |
| 5,502,726 | 3/1996 | Fischer | 370/94.1 |
| 5,598,581 | * 1/1997 | Daines et al. | 370/401 |
| 5,651,002 | 7/1997 | Van Seters et al. | 370/392 |
| 5,805,816 | * 9/1998 | Picazo, Jr. et al. | 370/401 |

OTHER PUBLICATIONS

ATM Forum: Technical Working Group; Title: Performance Issues in Vc–Merge Capable Switches for IP Over ATM, Indra Widjaja et al.; Date: Jul. 21–25, 1997; pp 1–18.

EtherSwitch® EPS–1500 (brochure) by Kalpana The EtherSwitch Company; Date: Sep. 1993.

EtherSwitch® Ethernet Packet Processor (brochure) by Kalpana, The Parallel Networking Company; Date: Unknown.

Switch.NLM v1.0–SW2000 (brochure) by Kalpana, The EtherSwitch Company; Date: Mar. 1994.

Tehranipour, Aby, Lester Lipsky; A Comparison of Three Switching Schemes in Isotropic Networks with Noisy Channels; IEEE Transaction on Telecommunications, vol. 41 No. 5 pp. 782–792, May 1993.*

Petr, David W., Camerin Braun, Rasheda Rabi; Delay Performance of Segmentation Options for Mixed Packet Networks; IEEE; pp. 84–88, Jan. 1994.*

Shin, Kang G., Stuart W. Daniel; Analysis and Implementation of Hybrid Switching; ISCA; pp. 211–219, Jun. 1995.*

Grossglauser, Matthias, K.K. Ramakrishnan; SEAM Scalable and Efficient ATM Multicast; IEEE; pp. 867–875, Apr. 1997.*

* cited by examiner

Primary Examiner—Chau Nguyen
Assistant Examiner—Jasper Kwoh
(74) Attorney, Agent, or Firm—Weingarten, Schurgin, Gagnebin & Hayes LLP

(57) ABSTRACT

A method and apparatus for performing virtual connection merging in an output port of a network switch are disclosed. In the event no completely assembled packets have been received and scheduled for transmission, a partially received packet is selected for cut-through transmission prior to receipt of all cells comprising the packet. Transmission of the selected packet is initiated and a timer is started. If the timer expires prior to the receipt of an end of packet indication for the packet for which transmission has commenced, and end of packet signal is generated and transmitted and the transmission of additional cells for the cut-through packet is aborted. In this manner, delays associated with packet reassembly may be avoided and buffer sizes of reassembly buffers may be reduced.

19 Claims, 4 Drawing Sheets

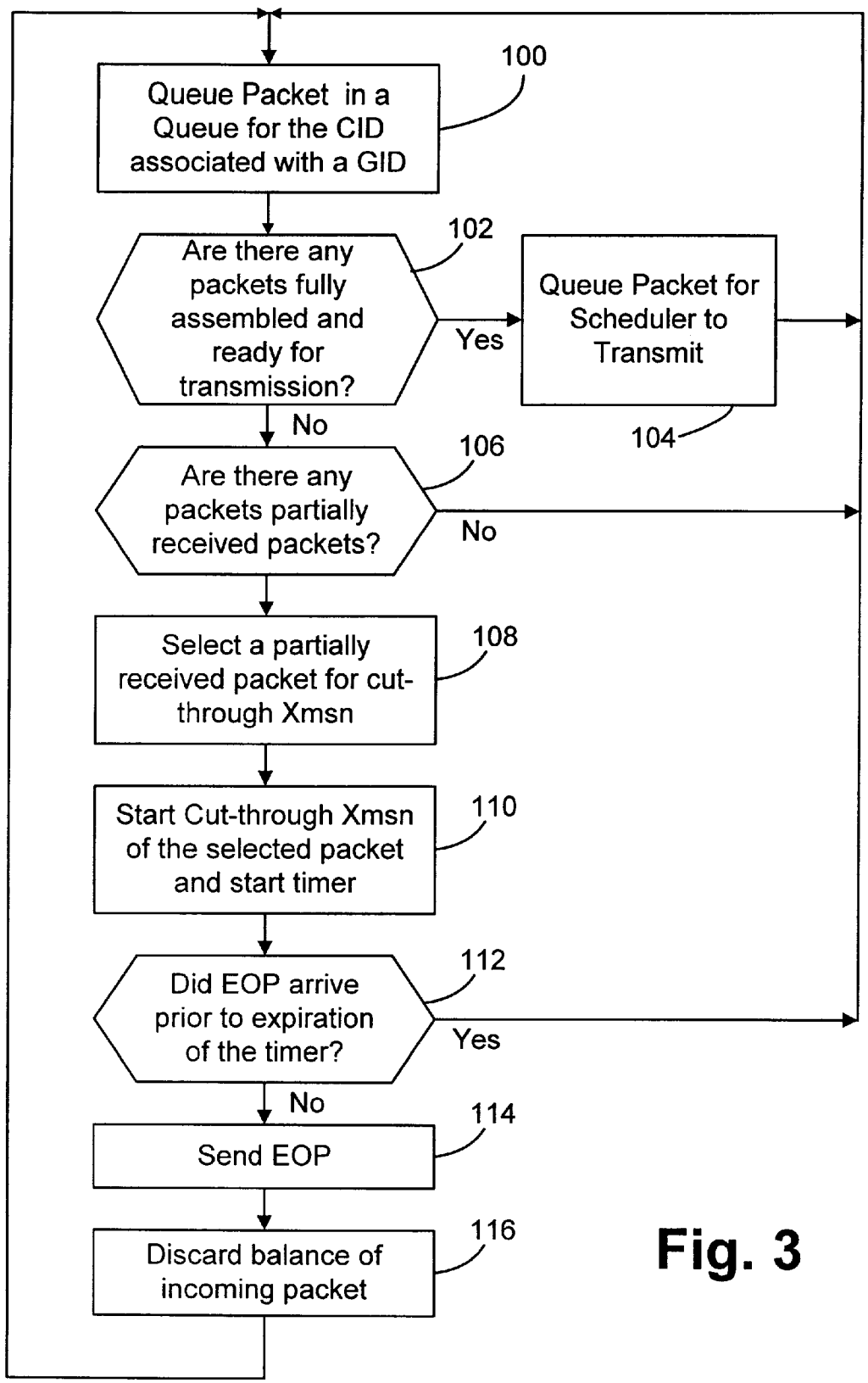

METHOD AND APPARATUS FOR PERFORMING CUT-THROUGH VIRTUAL CIRCUIT MERGING

BACKGROUND OF THE INVENTION

This invention relates to telecommunications networks and more particularly to a method and apparatus for performing virtual circuit merging in a connection based network.

In a connection based network, such as an Asynchronous Transfer Mode (ATM) network, packets are transmitted over virtual connections or circuits. Virtual circuits are established at call setup between a packet source and a packet destination. In the ATM environment, the Virtual Connections are defined by Virtual Path Identifier (VPI) and a Virtual Connection Identifier (VCI) fields within the ATM cell header.

Since ATM networks are connection-oriented, carrying connectionless traffic such as that based upon the Internet Protocol (IP) is problematic. Several methods exist for the routing of such information within an ATM network. The simplest form of mapping involves the assignment of a unique virtual circuit for each source and destination pair at the network switch. This technique, however, leads to the proliferation of connections or virtual circuits at each switch and results in large buffer requirements for connection identifier lookup tables in each network switch. Additionally, such an assignment technique is computationally intensive as a result of the need to process voluminous connection setup and tear down requests.

Various techniques have been proposed to minimize the need to establish a unique connection for each source destination pair. In one technique, known as Virtual Path merging, the Virtual Path (VPI) address labels, are used to identify the destination of the packet and all packets being forwarded to the same destination employ the same VPI. The Virtual Connection Identifier is employed to identify the packet source. Thus, in a network employing VP merging, a recipient of cells arriving over a single virtual path can identify the sender and reconstruct the packets even if the cells are interleaved. This technique, however, has a significant limitation. Since the Virtual Path Identifier field in the ATM cell header comprises a 12 bit field at the network to network interface, only 4096 Virtual Paths can be supported. The assignment of a single Virtual Path per destination, irrespective of the number of connections associated with the Virtual Path, is undesirably limiting with regard to the number of destinations that may be supported in the network. Thus, VP merging is typically wasteful of virtual connection assignments.

Virtual connection merging is a technique for forwarding all packets destined for the same destination address over the same VPI/VCI address. In order for the destination to successfully delineate packets from different sources, the cells comprising a packet must not be interleaved over the virtual connection. Accordingly, packets are typically assembled in a buffer on an egress Input Output (I/O) Module of a switch and are not scheduled for transmission until an End of Packet (EOP) indication is received. Only after all cells comprising a packet have been assembled in an egress I/O module buffer and an EOP received, is the packet scheduled for transmission over the respective Virtual Connection.

While the above described VC merging technique avoids problems introduced by the interleaving of cells of different packets, it has certain disadvantages. First, as a consequence of the need to fully buffer all packets prior to transmission in a store and forward manner and the fact that the packets may be variably sized, the reassembly buffers need to be quite large. Additionally, undesirable delays occur because the packet must be reassembled at each intermediate network node between the source and the destination. Each time the packet is reassembled, additional delays may be introduced.

It would therefore be desirable to be able to perform Virtual Connection (VC) merging while minimizing the aforementioned problems associated with prior VC merging techniques.

BRIEF SUMMARY OF THE INVENTION

A method and apparatus for performing virtual circuit merging in the egress port of a network switch is disclosed. Cells belonging to different packets are associated with a unique connection identifier (CID) upon arrival at an ingress port of the network switch. The connection identifiers (CIDs) for respective VPI/VCI addresses are assigned within the network switch at call setup as an administrative function. An identification of CIDs identifying packets to be merged over a single virtual circuit are associated with a single group identifier (GID) within the switch. If a packet associated with a GID has been fully received it is scheduled for transmission and transmission of the packet is initiated. If no packets associated with the GID have been completely assembled but one or more packets have been partially received, a partially received packet is identified in accordance with a predetermined selection technique and cut-through transmission of the selected packet from the network switch is initiated prior to the completion of reception and reassembly of the packet.

At the time the transmission of the partially received packet is initiated a timer is started. If the timer expires prior to receipt of an end of packet (EOP) indicator for the packet in transit, an EOP indicator is transmitted from the output port over the merged connection and the balance of the incoming packet is disregarded. In the above described manner, buffering requirements at the egress port and undesirable delays resulting from the need to schedule a packet only after it has been completely received are avoided.

BRIEF DESCRIPTION OF THE SEVERAL VIEWS OF THE DRAWING

The invention will be more fully understood by reference to the following Detailed Description of the Invention in conjunction with the several views of the drawing of which:

FIG. 3 is a flow chart illustrating the virtual circuit method in accordance with the present invention.

DETAILED DESCRIPTION OF THE INVENTION

An improved method and apparatus for performing virtual circuit merging in a network switch is disclosed which minimizes inherent delays in store and forward virtual circuit merging techniques and additionally provides the ability to utilize smaller reassembly cell buffers.

Figure 1:
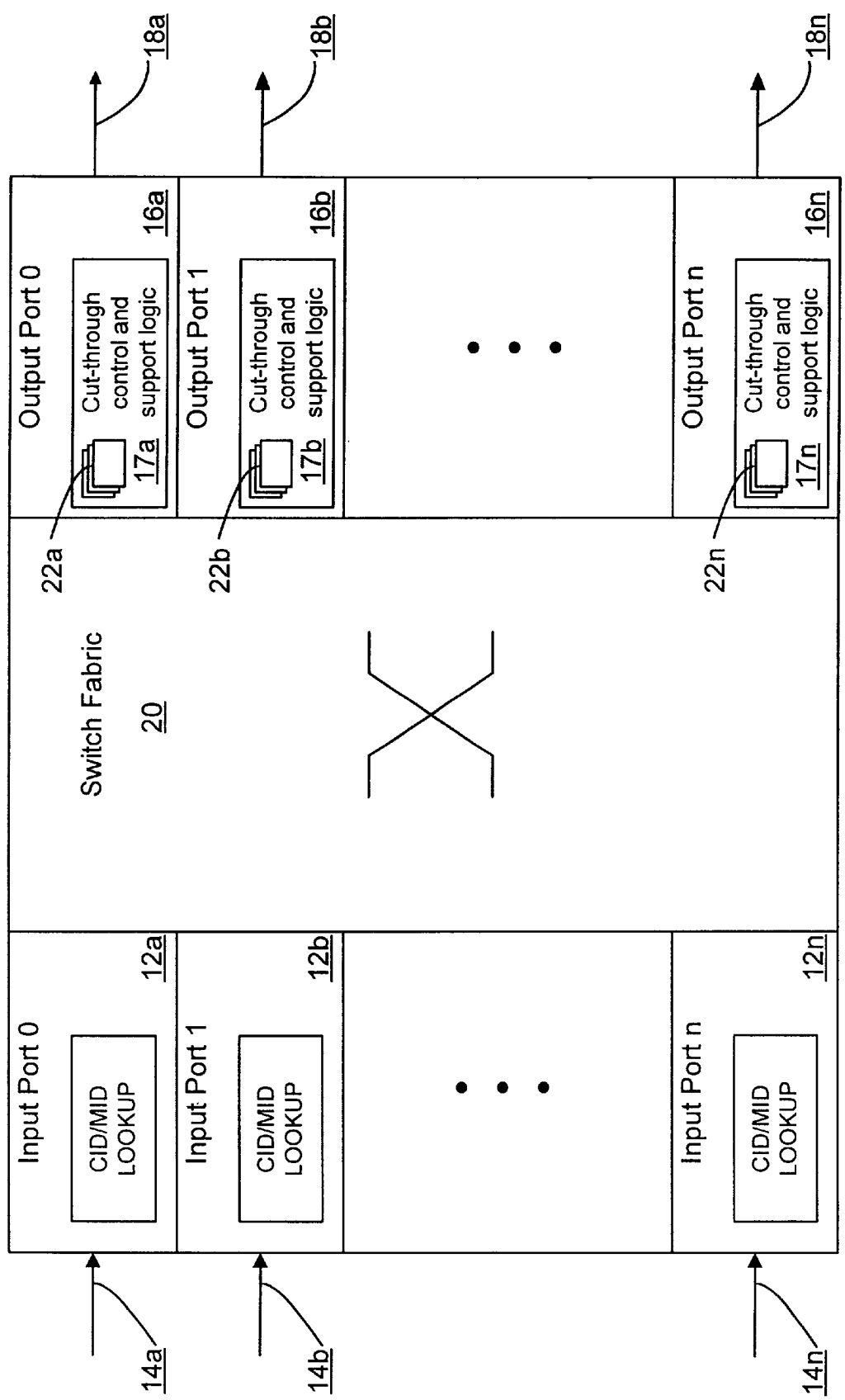
FIG. 1 is a block diagram of a network switch in accordance with the present invention.

Referring to FIG. 1 a network switch 10 in accordance with the present invention is depicted which incorporates the ability to perform cut-through virtual circuit merging. The network switch includes a plurality of input or ingress ports 12, identified herein as 12a, 12b, . . . 12n, for receiving packets from one or more ingress communication links 14 identified herein as 14a, 14b, . . . 14n, and a plurality of output or egress ports 16, identified herein as 16a, 16b, . . . 16n, for transmitting packets from each of the output ports to one or more egress communications links 18, identified herein as 18a, 18b, . . . 18n, which are coupled to the respective output ports 16. A packet comprises one or more cells, such as ATM cells. The end of a packet is signaled by an end of packet (EOP) indicator. A switch fabric 20 is operative to forward cells received a the input ports to one or more of the output ports 16 in accordance with forwarding techniques known in the art.

Upon reception at an input port, each cell is associated with a connection identifier (CID) which is employed within the network switch 10 to specify cell routing. Typically, the CID is generated upon receipt of a cell in an ATM network switch by performing a table lookup on the VPI/VCI address or some portion thereof to locate the CID for the respective cell. In the event that the cell is a multicast or broadcast cell intended for transmission out of more than one port, or plural links coupled to a single port (not shown), a multicast identifier (MID) is associated with the cell in the network switch upon reception to identify the cell as a multicast or broadcast cell. For simplicity, MIDs are considered herein as one form of CID.

The output ports 16a through 16n includes cell buffers 22a through 22n for buffering cells for transmission on a per virtual connection basis. Thus, the cell buffer 22a for output port 0 includes a plurality of cells buffers; i.e. one for each virtual connection assigned at call setup which utilizes output port 0. The output ports 16a through 16n further include cut-through control and support logic 17a, 17b, . . . 17n for controlling cut-through merging of virtual connections having the same VPI/VCI address as herein described.

As described above, Virtual Connection (VC) merging involves the transmission of packets having the same VPI/VCI address and which are received over one or more input ports from an output port 16 of the network switch 10 over a single virtual connection. For example, assume cells comprising a first packet having a VPI/VCI address of VPI=3/VCI=32 are received at Input Port 0. A first connection identifier (CID=A) is associated with the cells of the first packet at input port 0. Further assume a second packet is received at input port 1 having a VPI/VCI address of VPI=3/VCI=32. A second connection identifier (CID'B) is associated with the cells of the second packet at input port 1. The cells are forwarded through the switch fabric 20 to one or more of the output ports 16 and are stored in cell buffers 22 on a per Virtual Connection basis. Thus, one cell buffer is allocated for each virtual connection supported by the respective output port 16. The first and second packets, having the same VPI/VCI address, may be associated with a common group identifier (GID), and merged for transmission over a single virtual connection.

Figure 2:
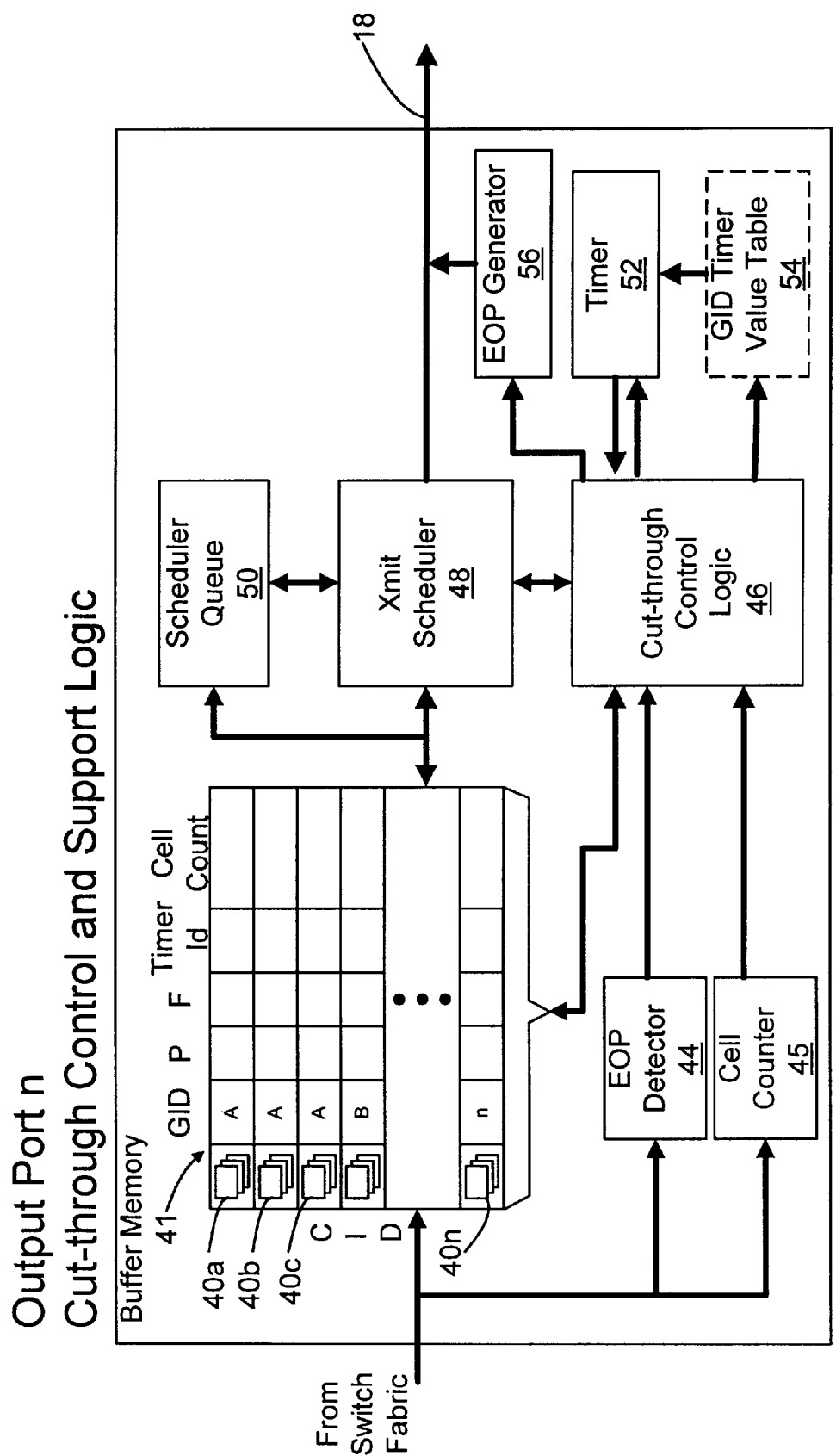
FIG. 2 is a block diagram of an egress portion of an I/O module in accordance with the present invention.

A block diagram illustrating the components within an Output Port 16 employed to implement cut-through VC merging is depicted with greater detail in FIG. 2. Referring to FIG. 2, an output port 16 receives cells from the switch fabric 20. Each cell has associated therewith a connection identifier (CID) which is employed within the network switch to determine cell routing. Each cell received at an output port 16 is stored within a cell buffer 40. The cell buffers for the respective virtual connections are identified in FIG. 2 as cell buffers 40a, 40b, . . . 40n. Thus, cells are stored within cell buffers within the output port on a per virtual connection basis. The connection identifier associated with the cell is employed to identify the cell buffer in which the respective cell is stored.

Cells belonging to different packets (from different sources) arrive at the output port with CID designations that are locally unique to the respective output port. A Buffer Memory 41 is provided in each output port. The Buffer Memory 41 contains cell buffers for packet reception and reassembly, such as buffers 40a, 40b, . . . 40n and additionally, fields for storage of data employed to support virtual circuit merging as hereinafter discussed. The buffer memory, in one embodiment of the invention, is indexed by the CIDs. For each of the CIDs, at call setup time, a unique group identifier (GID) is assigned for all CIDs to be merged on the outbound virtual connection and the GID associated with the CID is stored within the Buffer Memory 41. Otherwise stated, CIDs corresponding to incoming packets to be merged over a single outgoing virtual connection are assigned a common GID. Thus, as depicted in the exemplary embodiment, the first three CIDs contained within the Buffer Memory 41 all have a common GID and thus will be merged over a single outgoing virtual connection from the respective output port 16. Packets associated with the same GID are meant to be merged onto the same virtual connection and hence, cells of the respective packets must not be interleaved.

Referring to FIG. 2, cells received at the output port 16 are stored within the appropriate cell buffer 40 associated with the CID for the respective cell. If the CID is one of a plurality of CIDs having a common group ID (GID), the GID identifier is also stored in association with the cell buffer within the buffer memory 41.

A first flag (F) is also stored in association with the cell buffer which indicates whether or not a complete packet has been received and stored within the respective cell buffer. An End of Packet (EOP) Detector 44 monitors incoming cells and signals Cut-through control logic 46 when an EOP is detected. The control logic 46 causes the F flag to then be set for the corresponding CID thus indicating that a complete packet has been received. More specifically, if transmission of a packet has not been commenced via cut-through as hereinafter discussed and an EOP condition is detected by the EOP detector 44, the F flag is set via the cut through control logic to indicate that a complete packet has been stored within the respective cell buffer 40. The cut-through control logic 46 is also coupled to a transmit scheduler 48 which schedules completely assembled packets for transmission over the respective egress communications link 18.

A second flag (P) is also stored in the buffer memory 41 in association with the cell buffer for each CID. The P flag indicates whether a packet has been partially received and more specifically whether at least one cell of a packet has been stored within the cell buffer for the respective virtual connection.

The Buffer Memory 41 may optionally include a Timer Identifier (Timer ID) stored in association with each CID which is employed to specify the value of a timeout timer as hereafter discussed. IF employed, the Timer Id is specified at call setup and may be modified dynamically during system operation.

The Buffer Memory may also optionally include a cell count stored in association with each CID. The cell count comprises an identification of the number of cells of the respective packet which have been received and stored in the respective one of the reassembly cell buffers 40a, 40b, . . . 40n. The cell count is generated by a cell counter 45 which counts received cells for an incoming packet. The output of the cell counter 45 is coupled to the cut-through control logic 46 which loads the count into the appropriate location within the buffer memory 41.

In conventional network switches which support virtual circuit merging, the scheduler only schedules packets for transmission which have been completely received and reassembled within the output port cell buffer. In this manner, it can be assured that the entire packet can be transmitted without interleaving cells of any other packet. As discussed hereinabove, such is highly undesirable because transmission of the portion of packets which have been partially received and stored in a cell buffer 40 are delayed until the packet has been completely received.

The presently disclosed transmit scheduler stores the identity of fully assembled packets which are available for transmission within a scheduler queue 50. So long as there are completely assembled packets available for transmission, the transmit scheduler causes such packets to be transmitted downstream over the egress communication link 18.

The present scheduler, however, differs from conventional schedulers in that it does not wait until a packet has been completely received in the event there are no fully reassembled packets scheduled for transmission. More specifically, the transmit scheduler first determines whether there are any fully assembled packets available for transmission and schedules such packets for transmission. Such is determined by ascertaining whether there are any packets identified for transmission in the scheduler Queue 50 and by testing the F flag associated with each virtual connection buffer to determine if any of such flags are set for the respective GID. If there are no fully assembled packets scheduled for transmission and there are not completely assembled packets within the Buffer memory ; i.e. no F flags are set within the Buffer memory 41, an indication of such condition is provided by the transmit scheduler 48 to the cut through control logic 46. The cut through control logic then tests the P flags for the respective Virtual connections within the buffer memory to determine if there are any partially received packets. If there are no completely assembled packets available for transmission but there is at least one partially received packet within the cell buffer 41, a partially received packet is selected for cut-through transmission. Cut-through transmission implies that transmission of the partially received packet from the output port is initiated prior to receipt and storing of the entire packet within the respective cell buffer 40 of the buffer memory 41.

Figure 2A:
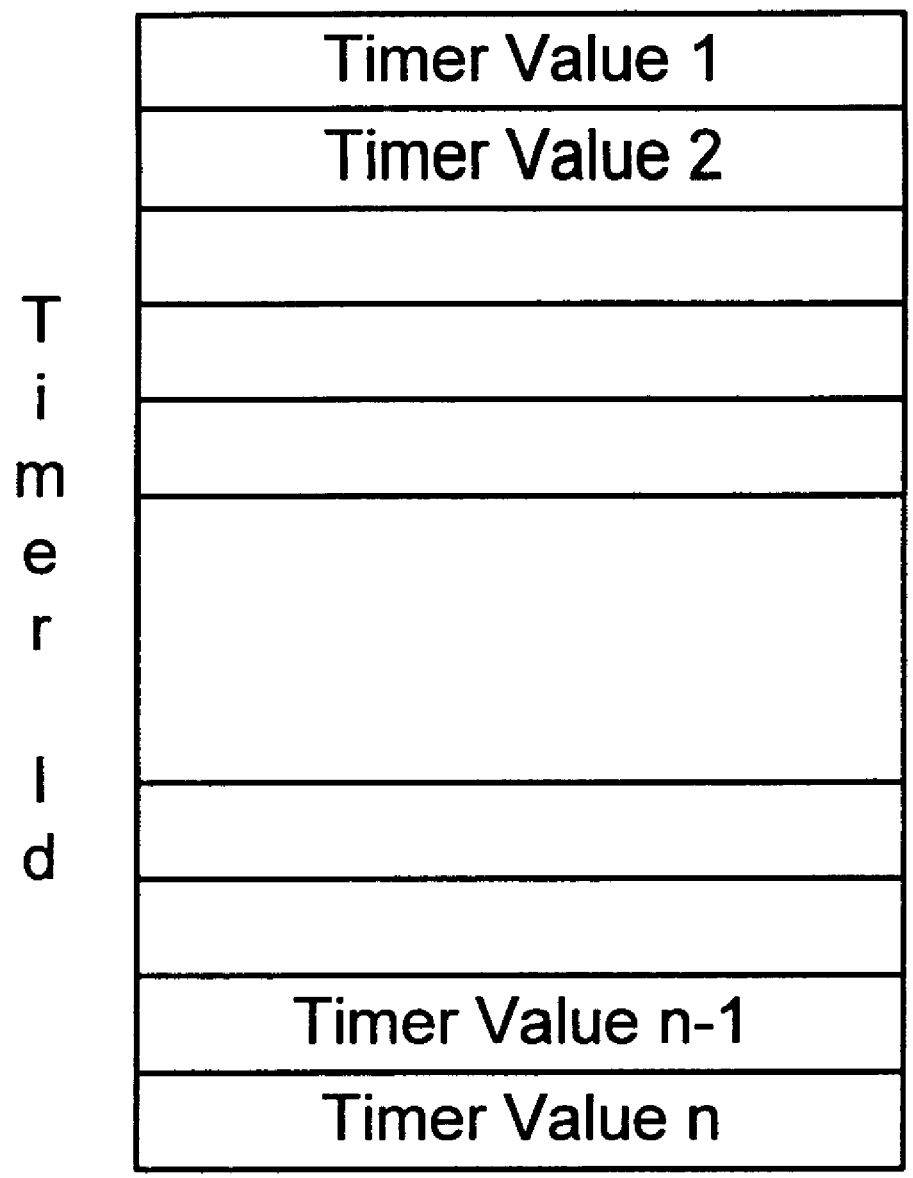
FIG. 2a is a timer value table optionally employed in the presently disclosed virtual connection merging technique.

In the event more than one partially received packet is stored in the buffer memory and associated with the same GID, one packet is selected for transmission via a predetermined selection technique. For example, in one embodiment, the first partially received packet detected by the cut-through logic which is associated with a valid CID may be selected for transmission, for example, via use of a round robin scheduler. In another embodiment, a count is maintained of the number of cells stored in the buffer for each virtual connection and the partially received packet having the largest number of buffered cells is selected for transmission. The cell count as described hereinabove is maintained within the cell count field of the buffer memory 41. In another embodiment, a timeout timer value is identified for each virtual connection and the packet is selected with the smallest timer value in order to minimize the impact on the scheduler should additional fully assembled packets be determined to be available for transmission. The timeout timer value may actually be stored with in the Timer Id field within the Buffer Memory or alternatively, the Timer ID field may be used to store an index into a timer value selection table 54 such as depicted in FIG. 2a. The utilization of the timeout timer is discussed in greater detail below. Any other suitable selection technique for selecting a partially assembled packet for transmission may also be employed.

Once a partially received packet has been selected for transmission, transmission of the packet is initiated by the cut-through control logic 46. At the time transmission of the partially received packet is commenced a timeout timer 52 is started. The length of the timeout period may be specified for each CID or for each GID. More specifically, the timer value may be loaded with a value selected for a particular CID or GID specified by the Timer Id field for the respective CID within the Buffer Memory 41. In this manner timeout values may be specified based upon the type of traffic associated with the respective connections. In the event that a timeout value is selected based upon the timer identifier field, the timer 52 is loaded with the timer timeout value prior to transmission of the packet and initiation of the timeout timer. The timer timeout values may be stored in the timer value table 54 as depicted in FIG. 2a or in any other suitable data structure.

To avoid the possibility that commencement of transmission of a cut-through packet will introduce unacceptable delays or hang up the scheduler in the event of upstream congestion or a failure to receive the remainder of a packet which has commenced cut-through transmission, the cut-through control logic 46 monitors the timeout timer 52 and the EOP Detector 44. If the cut-through control logic determines that the EOP detector has detected an EOP for the cut-through packet prior to expiration of the timeout timer, the timer is reset and control is passed to the transmit scheduler to determine if there are any fully assembled packets then available for transmission. Alternatively, if the cut-through control logic 46 detects the expiration of the timeout timer prior to the detection of an EOP signal for the cut-through packet, the cut-through control logic 46 causes the cut-through packet to cease transmission and causes an EOP generator 56 to generate an EOP signal for transmission over the egress communication link 18. The remainder of the cut-through packet received following the cessation of transmission of the packet and insertion of the EOP signal is disregarded and the F flag is not set upon receipt of the EOP signal. Similarly, the P flag is not set and the cell count is cleared to assure that the control logic 46 and the scheduler 48 do not improperly respond to the receipt of the remainder of the cell following the aborted cut through transmission. Control is then passed to the transmit scheduler to determine if there are any fully assembled packets available for transmission as discussed hereinabove.

The method of operation of the presently disclosed cut-through virtual circuit merging technique is further illustrated in FIG. 3. As depicted in step 100, upon receipt of cells at the output port comprising part of a packet, the cells are stored in cell buffers for the respective CID. As illustrated in decision step 102, inquiry is made whether there are any fully assembled packets available for transmission for the respective GID. IF there are one or more fully assembled packets available for transmission such packets are identified in the scheduler queue 50. If there are no fully assembled packets available for transmission, inquiry is made whether there are any partially received packets for the respective GID as illustrated in step 106. If there are no partially received packets available for transmission and no fully assembled packets available for transmission, control passes back to step 100 and the process continues. If there are any partially received packets available for transmission as determined via the inquiry step 106, one of the partially received packets is selected for cut-through transmission in accordance with predetermined selection criteria as depicted in step 108. Cut-through transmission of the selected packet is initiated as illustrated in step 110 and a timeout timer is initiated using either a predetermined timeout value or one selected as discussed hereinabove. If the EOP detector detects the arrival of the EOP for the cut-through packet prior to the expiration of the timeout timer 52, the fields within the Buffer Memory 41 are updated to clear the P and F flags, to clear the cell count (if used), and control passes back to step 100. If the EOP detector did not detect the EOP for the cut-through packet prior to expiration of the timeout timer 52, the cut-through control logic 46 aborts the cut-through transmission of the packet and signals the EOP generator to transmit an EOP signal over the egress communication link as depicted in step 114. The balance of the cut-through packet is disregarded, as depicted in step 116, the F, P and cell count (if used) are cleared and control returns to step 100. More specifically, the cut-through control logic 46 marks the CID so that the remainder of the packet is flushed from memory upon receipt.

In the above described manner, packet retransmission delays are minimized and cell buffering requirements may be reduced while assuring that packets merged over a single virtual connection are not interleaved. Additionally, undue delays are not introduced in the event of upstream congestion which delays receipt of the balance of a cut-through packet or in the event the balance of the packet will not be received due to the fact that the transmission of the packet was aborted by an upstream network device or as a consequence of an upstream transmission failure.

while the cut-through control logic has been depicted separately from the transmit scheduler for purpose of illustration, it should be appreciated that the control logic associated with the cut-through functions herein described may be incorporated within the scheduler 48.

Additionally, it should be appreciated that prioritization of the GIDs may be employed to assure appropriate qualities of service for the respective users of the various merged virtual connections.

It will further be appreciated by those of ordinary skill in the art that other modifications of and variation from the presently disclosed methods and apparatus for performing cut-through virtual circuit merging may be employed without departing from the inventive concepts disclosed herein. Accordingly, the invention is not to be viewed as limited except as by the scope and spirit of the appended claims.

What is claimed is:

1. A method for performing cut-through virtual connection merging at an output port of a network switch having a plurality of input ports in a connection based network comprising:
   determining whether any of a plurality of cell buffers being loaded from said respective plurality of input ports contains a fully received packet available for transmission over a virtual connection;
   if at least one fully received packet is determined to be available for transmission,
      selecting one of said fully received packets for transmission using a first predetermined selection criteria;
      transmitting said selected packet over said virtual connection; and
      returning to said determining step;
   if no fully received packets are determined to be available for transmission over said virtual connection, determining whether any of said plurality of cell buffers contains a partially received packet available for cut-through transmission over said virtual connection;
   if no partially received packets are determined to be available for transmission, returning to said determining step;
   if at least one partially received packet is determined to be available for transmission over said virtual connection,
      selecting one of the partially received packets for cut-through transmission using a second predetermined criteria for selection;
      initiating cut-through transmission of said selected partially received packet over said virtual connection;
      in the event an End of Packet signal is not received for the packet undergoing cut-through transmission prior to expiration of a predetermined period following the initiation of transmission of said cut-through packet, generating and transmitting over said virtual connection an End of Packet (EOP) indication; and
      returning to said determining step.

2. The method of claim 1 further comprising the step of:
   disregarding the remainder of said selected partially received packet following expiration of said predetermined period.

3. The method of claim 1 wherein said initiating step further includes the step of initiating a timer having a preset expiration period upon initiation of transmission of said partially received packet and said generating step further comprises the step of transmitting an End of Packet indication if said end of packet signal is not received for the packet undergoing cut-through transmission prior to expiration of said timer expiration period.

4. The method of claim 1 wherein said selecting step comprises the step of selecting the first partially received packet for cut-through transmission which is eligible for cut-through transmission and which is detected by a packet scheduler.

5. The method of claim 4 wherein said selecting step further comprises the step of testing packets for cut-through eligibility in a round robin sequence and selecting the first partially received packet which is detected in said round robin sequence that is eligible for cut-through transmission.

6. The method of claim 1 wherein said selecting step further comprises the step of associating a timer value with each packet that is eligible for cut through transmission and selecting the packet for cut-through transmission having the smallest timer value.

7. The method of claim 1 wherein said selecting step further comprises the steps of:
   maintaining a cell count of cells received for each packet eligible for cut-through transmission; and
   selecting a packet for cut through transmission having the largest cell count from the packets eligible for cut-through transmission.

8. The method of claim 1 wherein said method further comprises the steps of:
   at call setup, assigning a plurality of connection identifiers or ingress connections associated with corresponding VPI/VCI addresses;
   at call setup associating said plurality of connection identifiers with a group identifier specifying a single egress virtual connection a received packet having a VPI/VCI address associated with one of said plurality of connection identifiers;

wherein said packet selected for cut-through transmission merging is selected from packets associated with said group identifier.

9. Packet scheduling apparatus for merging packets ford transmission from a output port of a network switch over a virtual connection, said packets received as cells through a plurality of input ports of said network switch in a connection based network, the apparatus comprising:

a plurality of cell buffers for storing packets associated with a corresponding plurality of connection identifiers wherein each of said plurality of connection identifiers is associated with a group identifier identifying packets to be merged over said single virtual connection;

a loadable timer operative to produce a timeout signal a predetermined period following activation of said timer; and a scheduler, said scheduler being operative to check said plurality of cell buffers to determine whether there is at least one fully received packet in said plurality of cell buffers and, if no fully received packets are found, to determine by checking said plurality of cell buffers whether there is at least one partially received packet in said cell buffers, said scheduler being further operative to schedule a fully assembled packet stored within one of said plurality of cell buffers for transmission over said virtual connection in the event a fully assembled packet is available for transmission;

said scheduler being further operative to apply a predetermined criteria for selection to selectively initiate transmission of a partially received packet stored within one of said plurality of cell buffers, in the event no fully assembled packets are available for transmission and to activate said timer upon initiation of transmission of said partially received packet;

said scheduler being further operative to generate and transmit an end of packet signal in the event said scheduler detects said timeout signal prior to the completion of reception of said partially received packet in the respective one of said cell buffers; and said scheduler being further operative to return to the state of checking at completion of transmission of the currently transmitting packet.

10. The packet scheduling apparatus of claim 9 wherein said scheduler is further operative to disregard the remainder of said partially received packet following detection of said timeout signal in the event said scheduler detects said timeout signal prior to the completion of reception of said partially received packet.

11. The packet scheduling apparatus of claim 9 wherein a timer value is stored in the respective cell buffer associated with each connection identifier associated with said group identifier and said timer predetermined period is selected based upon the connection identifier for the respective packet.

12. The packet scheduling apparatus of claim 9 wherein said timer predetermined period is selected based upon the group identifier.

13. The packet scheduling apparatus of claim 9 wherein a pointer to a timer value stored in a timer value table is stored in the cell buffer associated with each connection identifier associated with said group identifier and said timer predetermined period is selected based upon the specified value within said timer value table.

14. The packet scheduling apparatus of claim 9 wherein said partially received packet comprises at least one cell stored within the respective cell buffer.

15. The packet scheduling apparatus of claim 14 wherein said at least one cell comprises at least one Asynchronous Transfer Mode cell.

16. The packet scheduling apparatus of claim 9 wherein said scheduler is operative to select the first partially received packet which is detected and eligible for transmission over said virtual connection.

17. The packet scheduling apparatus of claim 16 wherein said scheduler is operative to test said cell buffers associated with said group identifier to identify partially received packets eligible for transmission in a round robin sequence.

18. The packet scheduling apparatus of claim 9 wherein a timer value is associated with each connection identifier and employed to specify said timer predetermined period and said scheduler is operative to select for transmission the partially received packet associated with the smallest timer value in the event there are no fully received packets associated with said group identifier available for transmission.

19. The packet scheduling apparatus of claim 9 wherein a cell count identifying the number of cells stored within the cell buffer is maintained for each cell buffer associated with said group identifier and said scheduler is operative to select for transmission the partially received packet associated with the largest cell count in the event there are no fully received packets associated with said group identifier available for transmission.

* * * * *